United States Patent
Gray (10) Patent No.: US 6,678,003 B2
(45) Date of Patent: Jan. 13, 2004

(54) IMAGE DEINTERLACING SYSTEM FOR REMOVING MOTION ARTIFACTS AND ASSOCIATED METHODS

(75) Inventor: Gary Paul Gray, Orlando, FL (US)

(73) Assignee: Alcon, Inc., Hunenberg (CH)

( * ) Notice: Subject to any disclaimer, the term of this patent is extended or adjusted under 35 U.S.C. 154(b) by 0 days.

(21) Appl. No.: 10/152,658

(22) Filed: May 21, 2002

(65) Prior Publication Data

US 2003/0218691 A1 Nov. 27, 2003

(51) Int. Cl.[7] .............. H04N 7/01; H04N 5/21
(52) U.S. Cl. .......... 348/448; 348/447; 348/451; 348/452; 348/458; 348/459
(58) Field of Search .............. 348/448, 441, 348/451, 452, 458, 459, 699, 180, 447, 446, 607, 383; 345/3.2, 3.1, 611; 382/236

(56) References Cited

U.S. PATENT DOCUMENTS

| | | | |
|---|---|---|---|
| 4,750,057 A | 6/1988 | Baumeister | |
| 4,768,092 A | 8/1988 | Ishikawa | |
| 4,845,557 A | 7/1989 | Lang | |
| 5,047,849 A | 9/1991 | Hara | |
| 5,191,413 A | 3/1993 | Edgar | |
| 5,504,531 A | 4/1996 | Knee et al. | |
| 5,521,644 A | 5/1996 | Sezan et al. | |
| 5,602,654 A * | 2/1997 | Patti et al. | 358/461 |
| 5,767,987 A * | 6/1998 | Wolff et al. | 358/447 |
| 5,929,935 A | 7/1999 | Young et al. | |
| 5,943,099 A | 8/1999 | Kim | |
| 6,002,442 A * | 12/1999 | Li et al. | 348/447 |
| 6,005,980 A | 12/1999 | Eifrig et al. | |
| 6,026,195 A | 2/2000 | Eifrig et al. | |
| 6,061,094 A * | 5/2000 | Maietta | 348/446 |
| 6,130,723 A * | 10/2000 | Medin | 348/607 |
| 6,141,056 A | 10/2000 | Westerman | |
| 6,239,842 B1 | 5/2001 | Segman | |
| 6,317,165 B1 * | 11/2001 | Balram et al. | 348/699 |
| 6,330,032 B1 * | 12/2001 | Boehlke | 348/452 |
| 6,414,719 B1 * | 7/2002 | Parikh | 348/448 |
| 6,421,090 B1 * | 7/2002 | Jiang et al. | 348/452 |

* cited by examiner

*Primary Examiner*—John Miller
*Assistant Examiner*—Paulos Natnael
(74) *Attorney, Agent, or Firm*—Allen, Dyer, Doppelt, Milbrath & Gilchrist, P.A.

(57) ABSTRACT

Deinterlacing is applied to a composite video image that includes alternating even and odd rows of pixels. The even rows form a first image; the odd rows, a second image; these are recorded at different times, introducing a possibility of motion artifact. A first average horizontal intensity difference is computed between the first image and the second image. The first image is offset by one pixel in each horizontal direction to form a horizontally offset image, and another average horizontal intensity difference is computed. A minimum average intensity difference is determined from a comparison of the average horizontal intensity differences. The first image is shifted in a horizontal direction determined to achieve the minimum average horizontal intensity difference, and the horizontally shifted first image is combined with the second image to form an improved composite image. An analogous series of steps is carried out in a vertical direction.

25 Claims, 6 Drawing Sheets

IMAGE DEINTERLACING SYSTEM FOR REMOVING MOTION ARTIFACTS AND ASSOCIATED METHODS

FIELD OF THE INVENTION

The present invention relates to systems and methods for performing measurements of eye aberrations, such as prior to laser surgery, and, more particularly, to such systems and methods for deinterlacing video camera images.

DESCRIPTION OF RELATED ART

Video signals are known to be represented using a pair of fields, with a first field comprising, for example, odd-numbered horizontal lines, and a second field comprising even-numbered horizontal lines. In the interlaced scan format, each field of image data is scanned twice, once for each field, with the pair of fields then constituting one frame.

In the non-interlaced or progressive-scan format, an image is represented in its entirety using only a single field that includes pixels in all horizontal lines of the field matrix. This results in a higher-quality image reproduction, because of a lack of visual artifacts compared with interlaced scan displays. As a result, it is desirable to develop systems and methods for deinterlacing interlaced video image data.

The measurement of eye aberrations using a progressive-scan video camera is known in the art, which is more expensive than a camera using an interlaced scan format.

In the field of video image processing, Ishikawa (U.S. Pat. No. 4,768,092) uses interlaced image signals to create a high-resolution image by interpolating between two interlaced images. Lang (U.S. Pat. No. 4,845,557) manipulates one of two interlaced fields to detect and suppress motion. Motion detection is also taught in Hara (U.S. Pat. No. 5,047,849), with the use of multiple frames. Fast movement is also compensated for in Edgar (U.S. Pat. No. 5,191,413) by deleting an image area that is determined to have moved from an adjacent image area.

Motion artifacts are reduced by Knee (U.S. Pat. No. 5,504,531) using interpolation. Deinterlacing is accomplished by Sezan et al. (U.S. Pat. No. 5,521,644) with the use of four consecutive fields. Young et al. (U.S. Pat. No. 5,929,935) alter intensities of pixels to reduce image flicker.

SUMMARY OF THE INVENTION

It is therefore an object of the present invention to provide a system and method for deinterlacing eye images for assisting in performing ocular measurements.

It is a further object to provide such a system and method that obviates the need for using expensive progressive-scan cameras.

It is an additional object to provide such a system and method that compensates for the motion of an entire image relative to a camera.

It is another object to provide a system and method that removes motion artifacts in video scans.

These and other objects are achieved by the present invention, a video image deinterlacing system and associated methods. The composite video image to be deinterlaced by the present invention comprises alternating even and odd rows of pixels, each pixel having an intensity value associated therewith. The even rows comprise a first image, and the odd rows comprise a second image. The first and the second images are recorded at different times, thereby introducing a possibility of motion artifact between the collection of the first and the second images.

The method comprises the step of receiving a composite image and computing a first average horizontal intensity difference between the first image and the second image. Next the first image is offset by one pixel in a first horizontal direction to form a first horizontally offset image and a second average horizontal intensity difference is computed between the first horizontally offset image and the second image.

The first image is then offset by one pixel in a second horizontal direction that is opposite the first horizontal direction to form a second horizontally offset image. A third average horizontal intensity difference is computed between the second horizontally offset image and the second image, and a minimum average intensity difference is determined from a comparison of the first, the second, and the third average horizontal intensity differences.

The first image is then shifted in a horizontal direction determined to achieve the minimum average horizontal intensity difference, and the horizontally shifted first image is combined with the second image to form an improved composite image.

A system is also provided as part of the present invention for performing the above-described method.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–4B.

A system 10 (FIG. 1) and method 100 (FIGS. 2A,2B) for performing deinterlacing on a video eye image are provided. The system 10 comprises a processor 11 having a software package 12 resident thereon. In electronic communication with the processor 11 is a video camera 13 that is positionable along an optical axis 14 in alignment with an eye 90 desired to be imaged. Between the eye 90 and the video camera 13 is positioned a lens combination 15 that includes a beam splitter 16, which permits the eye 90 to view a target image 17, upon which the patient is requested to fixate during the imaging process.

Figure 3:
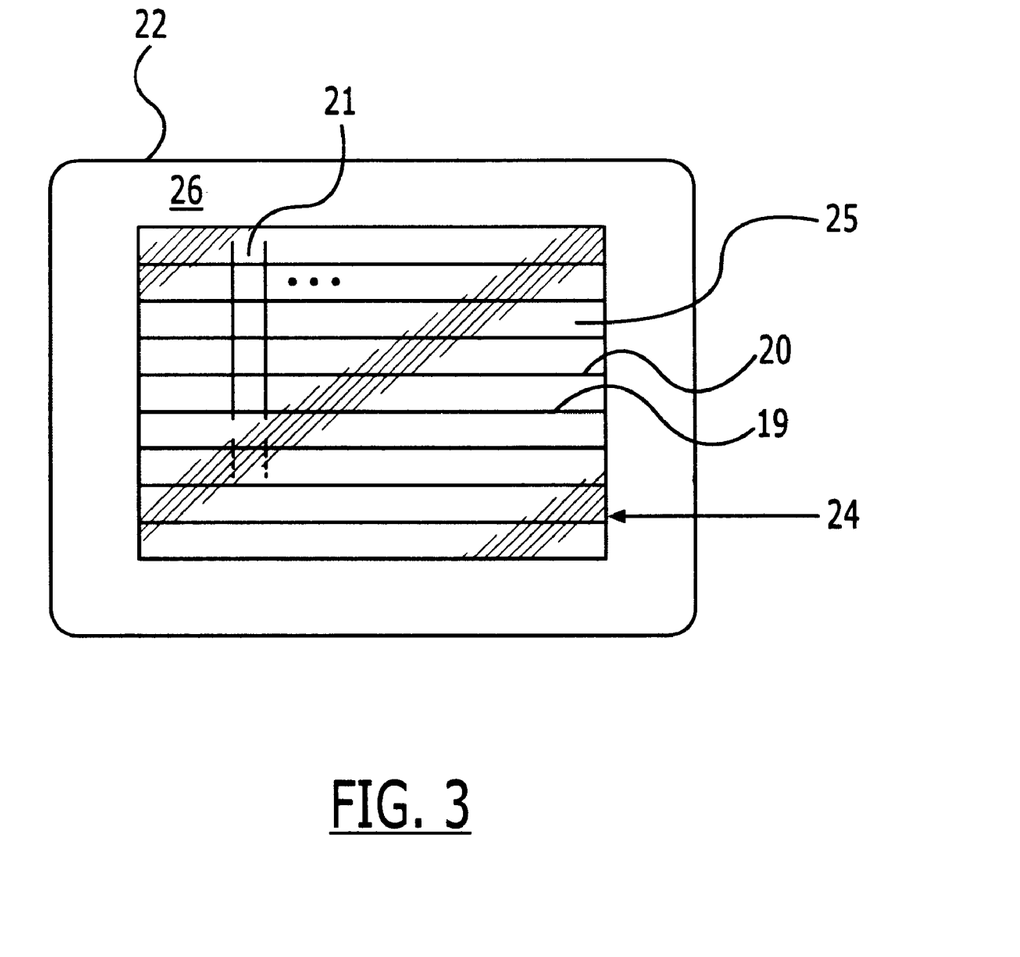
FIG. 3 is a schematic of a video eye image matrix.
Figure 4A:
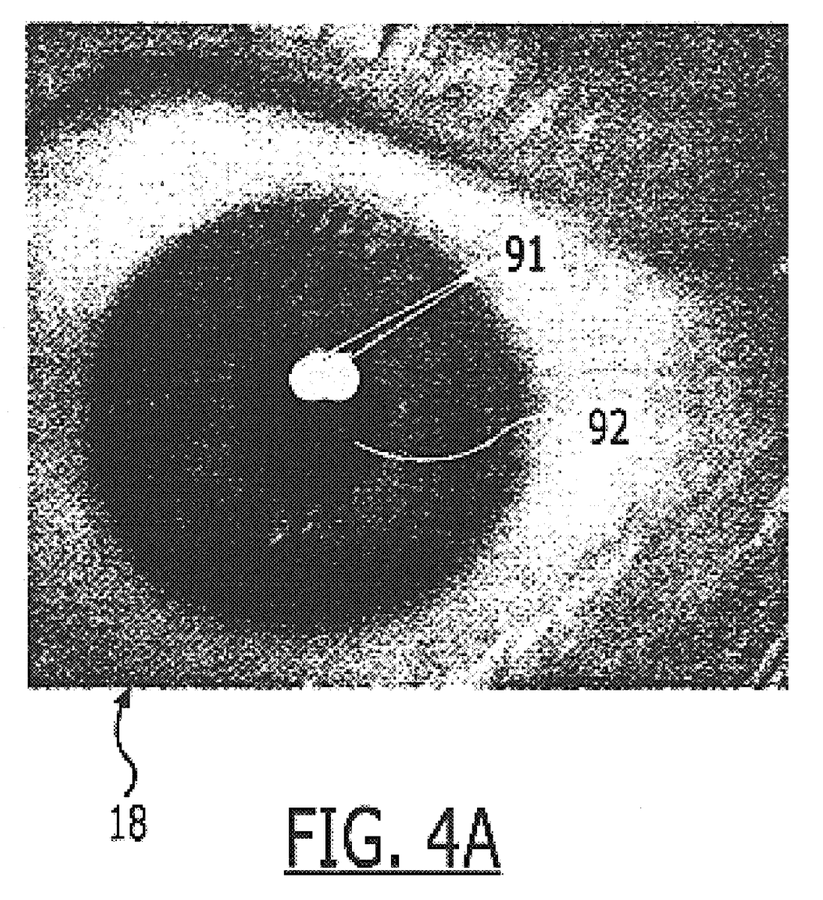
FIGS. 4A and 4B are exemplary composite and improved composite eye images.

The video camera 13 is adapted to record data representative of a composite image 18 (FIG. 4A; block 101). The composite image data comprise intensity values for alternating even 19 and odd 20 rows of pixels 21 (FIG. 3). The even rows 19 comprise a first image and the odd rows 20 comprise a second image, where the first and the second images are recorded at different times. The composite image 18 comprises n rows and m columns. Typically the recording rate of the video camera 13 will impose a time difference between the first and the second image of approximately 20 ms between fields for phase alternating line (PAL) video images. During this time, motion of the eye 90 may occur, leading to motion artifacts in the recorded composite image 18. For example, note the blurring of the light spots 91 on the cornea 92 in FIG. 4A.

The system 10 further comprises a video display 22 for displaying the composite image 18 and the improved, deinterlaced composite image 18' (FIG. 4B) for permitting a visual comparison therebetween.

Prior to transmitting the composite image data to the processor 11, a matrix 24 is established therein (block 102). The composite image 18 is then digitized (block 103) and imported into a central region 25 of the matrix 24 (block 104), leaving a border region 26 of 20 pixels along each edge of the composite image 18 free from data.

Figure 1:
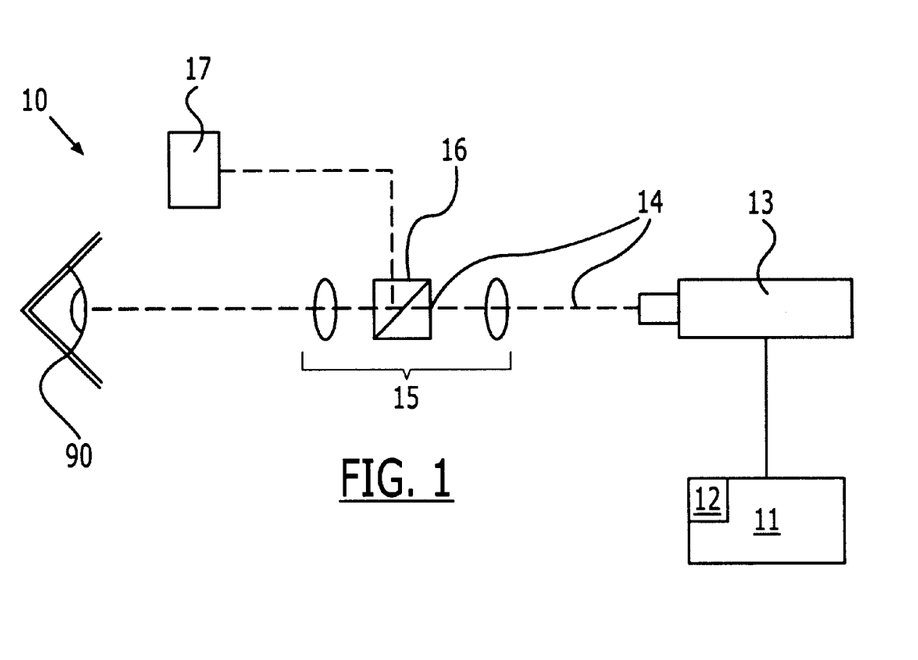
FIG. 1 is a schematic diagram of the image deinterlacing system of the present invention.
Figure 2A:
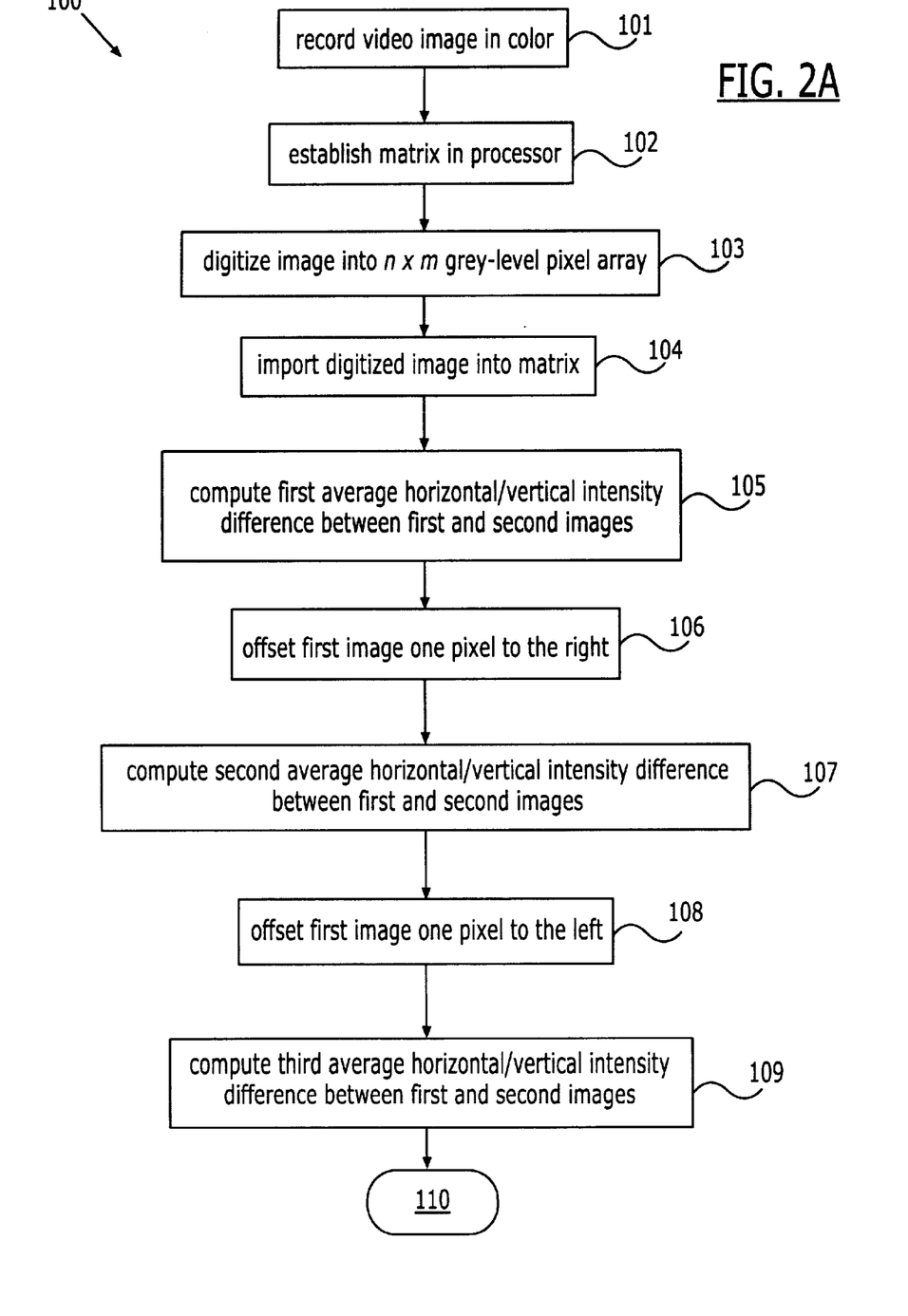
FIGS. 2A,2B is a flow chart of the method of the present invention.
Figure 2B:
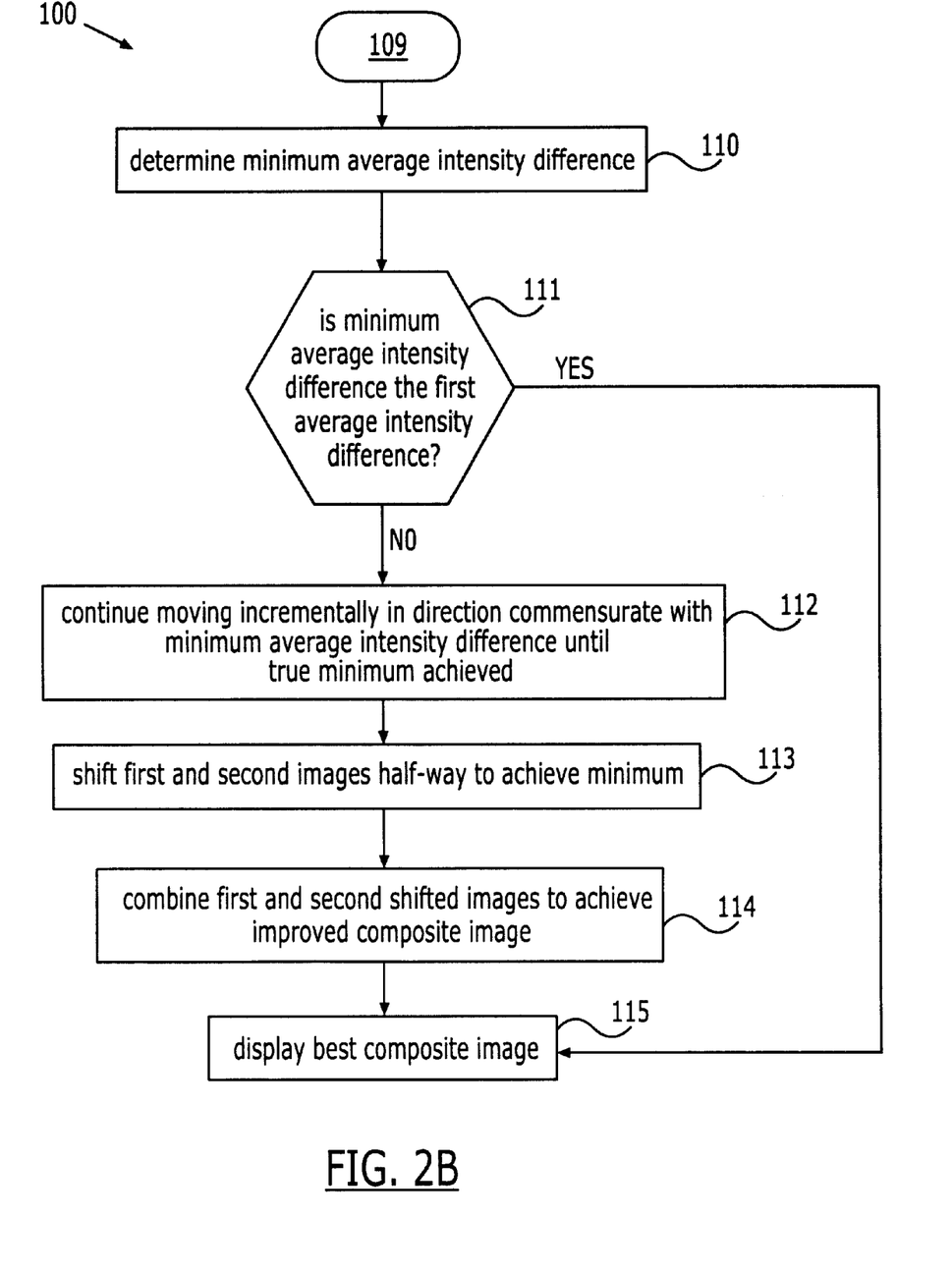

A software package 12 is installable on the processor 11 for achieving the image deinterlacing of the present invention (FIGS. 2A,2B). The software package 12 is adapted to convert a color interlaced image into a grey-scale digitized interlaced image comprising the composite image 18.

The image processing includes computing a first average horizontal intensity difference between the first image and the second image (block 105). The first image is then offset by one pixel in a first horizontal direction, e.g., to the right, to form a first horizontally offset image (block 106). This image "sliding" occurs using the border region 26 established in the matrix 24 at block 103. A second average horizontal intensity difference is computed between the first horizontally offset image and the second image (block 107).

Next the first image is offset by one pixel in a second horizontal direction opposite the first horizontal direction, e.g., to the left, to form a second horizontally offset image (block 108), and a third average horizontal intensity difference is computed between the second horizontally offset image and the second image (block 109).

A minimum average intensity difference is then determined from a comparison of the first, the second, and the third average horizontal intensity differences (block 110).

If the minimum average intensity difference is not the first average horizontal intensity difference (block 111), that is, if a horizontal offset improves the image matching, this procedure is preferably repeated by offsetting the first image by two pixels in the direction of improvement (block 112). For example, if the average intensity difference is improved by offsetting one pixel to the right, another pass is made by offsetting the first image two pixels to the right, and this procedure is continued until a minimum difference is achieved.

Once the minimum horizontal difference is determined, the first image is shifted in a horizontal direction commensurate with achieving this minimum.

This process is then repeated in a vertical direction, with the first image shifted in a vertical direction commensurate with achieving a vertical minimum difference. Preferably the shifting steps are performed on the color image.

In a most preferred embodiment, in order to preserve the absolute position of the features within the image, the shifting steps are applied to both the first and the second image, with one-half the shifting performed on each (block 113). Thus, if the first image is intended to be shifted two pixels to the right, the first image would actually be shifted one pixel to the right, and the second image would be shifted one pixel to the left.

Figure 4B:
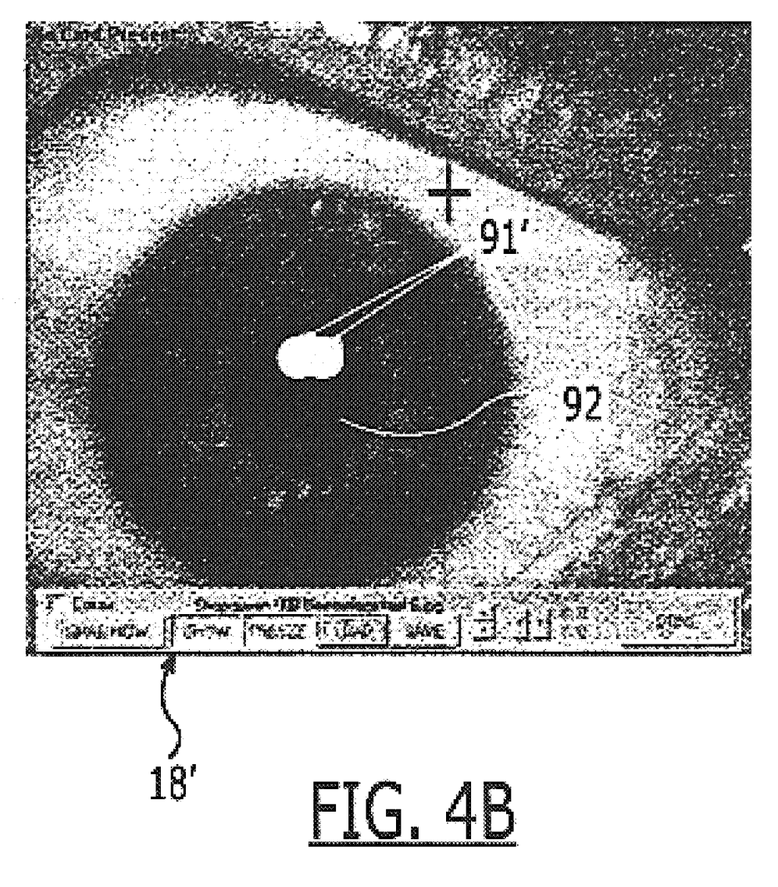

Finally, the vertically and the horizontally shifted first images are combined with the second image to form an improved composite image 18' (FIG. 4B; block 114). The best composite image 18' is displayed to a user (block 115); note the improvement in the resolution of the light spot 91'.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method of deinterlacing a video image comprising the steps of:

receiving a composite image comprising alternating even and odd rows of pixels, the even rows comprising a first image and the odd rows comprising a second image, the first and the second image recorded at different times, each pixel having an intensity value;

computing a first average horizontal intensity difference between the first image and the second image;

offsetting the first image by one pixel in a first horizontal direction to form a first horizontally offset image;

computing a second average horizontal intensity difference between the first horizontally offset image and the second image;

offsetting the first image by one pixel in a second horizontal direction opposite the first horizontal direction to form a second horizontally offset image;

computing a third average horizontal intensity difference between the second horizontally offset image and the second image;

determining a minimum average intensity difference from a comparison of the first, the second, and the third average horizontal intensity differences;

shifting the first image in a horizontal direction determined to achieve the minimum average horizontal intensity difference; and combining the horizontally shifted first image with the second image to form an improved composite image.

2. The method recited in claim 1, further comprising the step, prior to the receiving step, of converting a color interlaced image into a grey-scale digitized interlaced image comprising the composite image.

3. The method recited in claim 2, wherein the shifting step comprises shifting the color image.

4. The method recited in claim 1, further comprising the steps, prior to the shifting step, of:

if the minimum average intensity difference comprises one of the second or the third average intensity difference, offsetting the first image by two pixels in a horizontal direction commensurate with the minimum average intensity difference to form a fourth offset image; and computing a fourth average intensity difference between the fourth offset image and the second image; and wherein the determining step comprises determining a minimum average intensity difference from a comparison of the first, the second, the third, and the fourth average intensity differences.

5. The method recited in claim 4, wherein, if the minimum average intensity difference comprises the fourth average intensity difference:

the shifting step comprises shifting the first image in the determined direction by one pixel and shifting the second image in a direction opposite the determined direction by one pixel; and the combining step comprises combining the shifted first image with the shifted second image to form the improved composite image.

6. The method recited in claim 1, further comprising the steps of:

computing a first average vertical intensity difference between the first image and the second image;

offsetting the first image by one pixel in a first vertical direction to form a first vertically offset image;

computing a second average vertical intensity difference between the first vertically offset image and the second image;

offsetting the first image by one pixel in a second vertical direction opposite the first vertical direction to form a second vertically offset image;

computing a third average vertical intensity difference between the second vertically offset image and the second image;

determining a minimum average intensity difference from a comparison of the first, the second, and the third average vertical intensity differences;

shifting the first image in a vertical direction to achieve the minimum average vertical intensity difference; and wherein the combining step comprises combining the vertically and the horizontally shifted first image with the second image to form an improved composite image.

7. The method recited in claim 1, wherein the composite image comprises n rows and m columns, and further comprising the step, prior to the receiving step, of establishing a matrix in a processor having a size of at least n+2 rows by m+2 columns, and wherein the receiving step comprises importing the composite image into a central region of the matrix, leaving at least one additional row and column along each edge of the composite image free from data.

8. The method recited in claim 1, further comprising the step of displaying the composite image and the improved composite image to a user to permit a visual comparison therebetween.

9. A method of deinterlacing a video image of an eye comprising the steps of:

acquiring a video image of an eye fixated on a target;

receiving the video eye image comprising alternating even and odd rows of pixels, the even rows comprising a first image and the odd rows comprising a second image, the first and the second image recorded at different times, each pixel having an intensity value;

computing a first average horizontal intensity difference between the first image and the second image;

offsetting the first image by one pixel in a first horizontal direction to form a first horizontally offset image;

computing a second average horizontal intensity difference between the first horizontally offset image and the second image;

offsetting the first image by one pixel in a second horizontal direction opposite the first horizontal direction to form a second horizontally offset image;

computing a third average horizontal intensity difference between the second horizontally offset image and the second image;

determining a minimum average intensity difference from a comparison of the first, the second, and the third average horizontal intensity differences;

shifting the first image in a horizontal direction determined to achieve the minimum average horizontal intensity difference; and combining the horizontally shifted first image with the second image to form an improved video eye image.

10. The method recited in claim 9, further comprising the step, prior to the receiving step, of converting a color interlaced image into a grey-scale digitized interlaced image comprising the video eye image.

11. The method recited in claim 9, further comprising the step of displaying the video eye image and the improved video eye image to a user to permit a visual comparison therebetween.

12. The method recited in claim 9, wherein the video image acquiring step comprises directing a video camera at an eye fixated on a target.

13. A system for deinterlacing a video image comprising:

a processor;

means for transmitting data representative of a composite image to the processor, the composite image data comprising intensity values for alternating even and odd rows of pixels, the even rows comprising a first image and the odd rows comprising a second image, the first and the second image recorded at different times; and a software package installable on the processor adapted to:

compute a first average horizontal intensity difference between the first image and the second image;

offset the first image by one pixel in a first horizontal direction to form a first horizontally offset image;

compute a second average horizontal intensity difference between the first horizontally offset image and the second image;

offset the first image by one pixel in a second horizontal direction opposite the first horizontal direction to form a second horizontally offset image;

compute a third average horizontal intensity difference between the second horizontally offset image and the second image;

determine a minimum average intensity difference from a comparison of the first, the second, and the third average horizontal intensity differences;

shift the first image in a horizontal direction determined to achieve the minimum average horizontal intensity difference; and combine the horizontally shifted first image with the second image to form an improved composite image.

14. The system recited in claim 13, wherein the software package is further adapted to convert a color interlaced image into a grey-scale digitized interlaced image comprising the composite image.

15. The system recited in claim 13, wherein the software package is adapted to shift the color image.

16. The system recited in claim 13, wherein the software package is further adapted, prior to the first image shift, to:
if the minimum average intensity difference comprises one of the second or the third average intensity difference, offset the first image by two pixels in a horizontal direction commensurate with the minimum average intensity difference to form a fourth offset image; and
compute a fourth average intensity difference between the fourth offset image and the second image; and
wherein the minimum average intensity difference determination is made from a comparison of the first, the second, the third, and the fourth average intensity differences.

17. The system recited in claim 16, wherein, if the minimum average intensity difference comprises the fourth average intensity difference, the software package is adapted to:
shift the first image in the determined direction by one pixel and to shift the second image in a direction opposite the determined direction by one pixel; and
combine the shifted first image with the shifted second image to form the improved composite image.

18. The system recited in claim 13, wherein the software package is further adapted to:
compute a first average vertical intensity difference between the first image and the second image;
offset the first image by one pixel in a first vertical direction to form a first vertically offset image;
compute a second average vertical intensity difference between the first vertically offset image and the second image;
offset the first image by one pixel in a second vertical direction opposite the first vertical direction to form a second vertically offset image;
compute a third average vertical intensity difference between the second vertically offset image and the second image;
determine a minimum average intensity difference from a comparison of the first, the second, and the third average vertical intensity differences;
shift the first image in a vertical direction to achieve the minimum average vertical intensity difference; and
wherein the vertically and the horizontally shifted first image are combined with the second image to form an improved composite image.

19. The system recited in claim 13, wherein the composite image comprises n rows and m columns, and wherein the software package is further adapted, prior to the receiving step, to establish a matrix in a processor having a size of at least n+2 rows by m+2 columns, and to import the composite image into a central region of the matrix, leaving at least one additional row and column along each edge of the composite image free from data.

20. The system recited in claim 13, further comprising:
a video display for displaying the composite image and the improved composite image to a user to permit a visual comparison therebetween.

21. The system recited in claim 13, wherein the data transmitting means comprises a video camera.

22. A system for deinterlacing a video image of an eye comprising:
a video camera positionable to acquire a video image of an eye;
a processor;
means for transmitting data representative of the video eye image to the processor, the video eye image comprising alternating even and odd rows of pixels, the even rows comprising a first image and the odd rows comprising a second image, the first and the second image recorded at different times, each pixel having an intensity value; and
a software package installable on the processor adapted to:
compute a first average horizontal intensity difference between the first image and the second image;
offset the first image by one pixel in a first horizontal direction to form a first horizontally offset image;
compute a second average horizontal intensity difference between the first horizontally offset image and the second image;
offset the first image by one pixel in a second horizontal direction opposite the first horizontal direction to form a second horizontally offset image;
compute a third average horizontal intensity difference between the second horizontally offset image and the second image;
determine a minimum average intensity difference from a comparison of the first, the second, and the third average horizontal intensity differences;
shift the first image in a horizontal direction determined to achieve the minimum average horizontal intensity difference; and
combine the horizontally shifted first image with the second image to form an improved video eye image.

23. The system recited in claim 22, wherein the software package is further adapted to convert a color interlaced image into a grey-scale digitized interlaced image comprising the video eye image.

24. The system recited in claim 22, further comprising a video display for displaying the video eye image and the improved video eye image to a user to permit a visual comparison therebetween.

25. The system recited in claim 22, further comprising:
a beam splitter positioned along an optical axis; and
means for projecting a target image onto the beam splitter for visualization by the eye; and
wherein the video camera is positioned along the optical axis, the beam splitter between the video camera and the target image projecting means, for permitting the eye to fixate on the target image during image collection by the video camera.

* * * * *